(12) United States Patent
Corvaglia et al.

(10) Patent No.: US 12,545,392 B2
(45) Date of Patent: Feb. 10, 2026

(54) METHOD FOR THE MANUFACTURE OF A STRUCTURAL COMPONENT IN COMPOSITE MATERIAL REINFORCED WITH STIFFENING STRINGERS AND STRUCTURAL COMPONENT

(71) Applicant: LEONARDO S.P.A., Rome (IT)

(72) Inventors: Stefano Giuseppe Corvaglia, Taranto (IT); Nicola Gallo, Taranto (IT); Alessandro Serio, Taranto (IT)

(73) Assignee: LEONARDO S.P.A. (IT)

( * ) Notice: Subject to any disclaimer, the term of this patent is extended or adjusted under 35 U.S.C. 154(b) by 201 days.

(21) Appl. No.: 18/258,696

(22) PCT Filed: Dec. 22, 2021

(86) PCT No.: PCT/IB2021/062160
§ 371 (c)(1),
(2) Date: Jun. 21, 2023

(87) PCT Pub. No.: WO2022/144699
PCT Pub. Date: Jul. 7, 2022

(65) Prior Publication Data
US 2024/0326354 A1    Oct. 3, 2024

(30) Foreign Application Priority Data
Dec. 22, 2021   (IT) .......................... 102020000032490

(51) Int. Cl.
*B64C 1/06*      (2006.01)
*B29C 70/44*     (2006.01)
(Continued)

(52) U.S. Cl.
CPC ............ *B64C 1/068* (2013.01); *B29C 70/443* (2013.01); *B29C 70/541* (2013.01);
(Continued)

(58) Field of Classification Search
CPC ... B29C 70/544; B29C 70/443; B29C 70/541; B29C 2045/0058; B29D 99/0053; B64F 5/10
See application file for complete search history.

(56) References Cited

U.S. PATENT DOCUMENTS 4,822,436 A * 4/1989 Callis ...................... B29C 70/30
                                                          156/264
5,350,138 A    9/1994 Culbertson et al.
(Continued)

FOREIGN PATENT DOCUMENTS

DE    102009056978 A1    6/2011
EP         0319449    * 11/1993
(Continued)

OTHER PUBLICATIONS

Search Report issued in PCT/IB2021/062160 on Mar. 21, 2022.
(Continued)

*Primary Examiner* — Michael A Tolin
(74) *Attorney, Agent, or Firm* — The Belles Group, P.C.

(57) ABSTRACT

A method to manufacture a structural component in composite material reinforced with stiffening stringers and comprising a skin and plurality of stringers having a hollow section fixed to said skin. The method comprising: a) laminating a plurality of first layers of composite material onto an external surface of a cure tool, b) laminating pluralities of second layers of composite material on longitudinal hollow expandable inserts, c) positioning each reinforcing element on a face of a second skin, d) holding each reinforcing element on the face of the second skin; e) housing the tool, skin and reinforcing elements inside a vacuum bag; and f) compacting together the first layers forming the skin with the second layers forming the stringers; g) housing skin and reinforcing elements in a further
(Continued)

vacuum bag; and h) sealing the further vacuum bag; and i) applying preset temperature and pressure to the outside of the vacuum chamber.

9 Claims, 12 Drawing Sheets

(51) Int. Cl.
    *B29C 70/54*     (2006.01)
    *B64C 1/00*     (2006.01)
    *B64C 1/12*     (2006.01)

(52) U.S. Cl.
    CPC ............ *B29C 70/544* (2021.05); *B64C 1/064* (2013.01); *B64C 1/12* (2013.01); *B64C 2001/0072* (2013.01)

(56) References Cited

U.S. PATENT DOCUMENTS

| | | | |
|---|---|---|---|
| 7,854,874 B2 * | 12/2010 | Martin | B29D 99/0014 |
| | | | 249/82 |
| 8,911,585 B2 | 12/2014 | Barlag et al. | |
| 9,873,500 B2 | 1/2018 | Wilcoxson et al. | |
| 10,807,737 B2 | 10/2020 | Wilcoxson et al. | |
| 2010/0009124 A1 * | 1/2010 | Robins | B29C 33/405 |
| | | | 156/185 |
| 2013/0000815 A1 | 1/2013 | Barlag et al. | |
| 2014/0186586 A1 * | 7/2014 | Victorazzo | B64C 1/12 |
| | | | 428/167 |
| 2015/0122413 A1 | 5/2015 | Inserra et al. | |
| 2016/0075092 A1 | 3/2016 | Wilcoxson et al. | |
| 2017/0066202 A1 | 3/2017 | Mcbrayer et al. | |
| 2018/0111672 A1 | 4/2018 | Wilcoxson et al. | |
| 2021/0253220 A1 * | 8/2021 | Clark | B64C 1/12 |

FOREIGN PATENT DOCUMENTS

| | | | |
|---|---|---|---|
| EP | 2998228 A1 | 3/2016 | |
| EP | 3112116 B1 * | 8/2018 | ........... B29C 33/505 |

OTHER PUBLICATIONS

Written Opinion of the International Searching Authority issued in PCT/IB2021/062160 on Mar. 21, 2022.
Written Opinion of the International Preliminary Examining Authority issued in PCT/IB2021/062160 on Nov. 24, 2022.

* cited by examiner

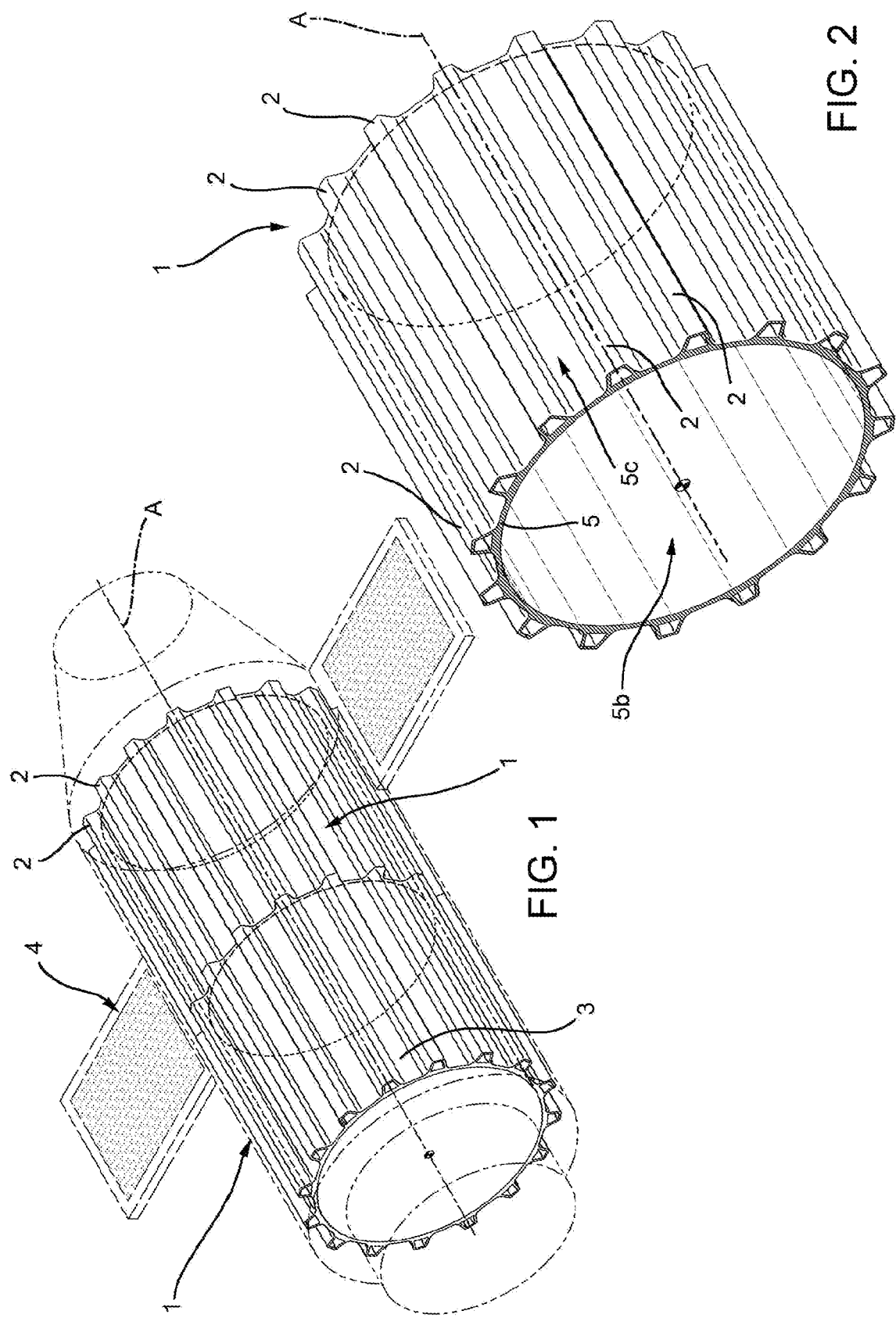

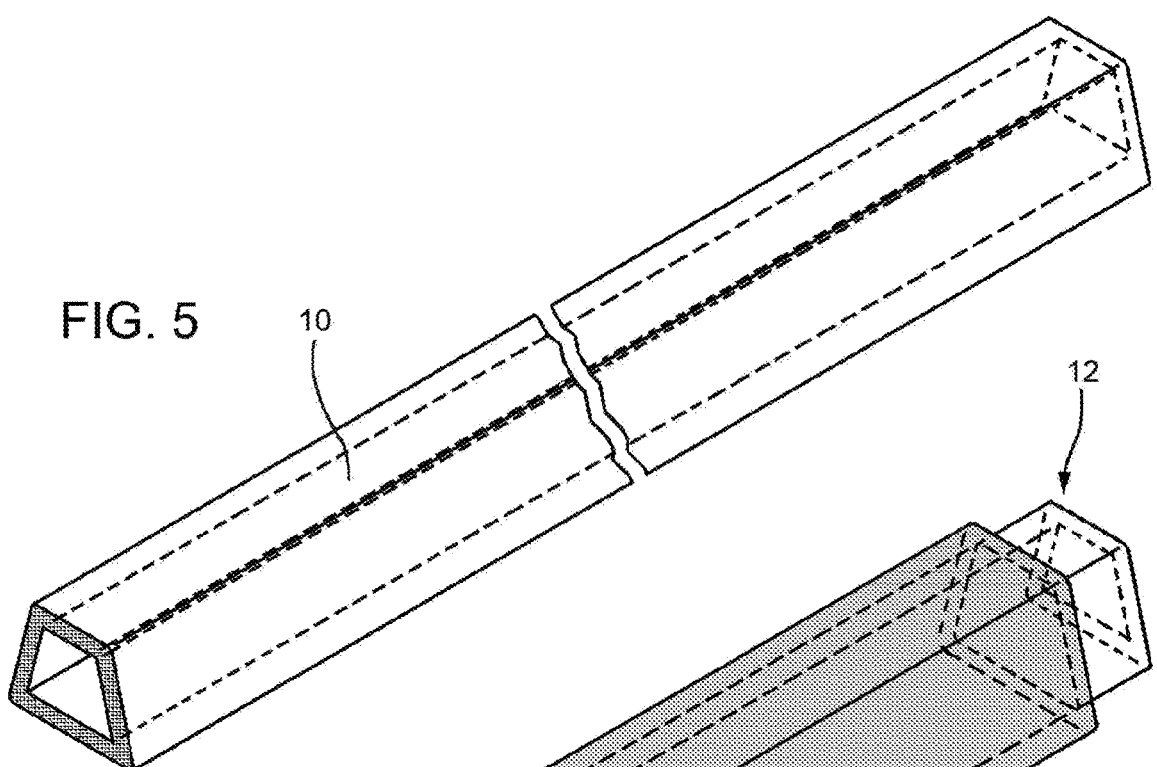
FIG. 5
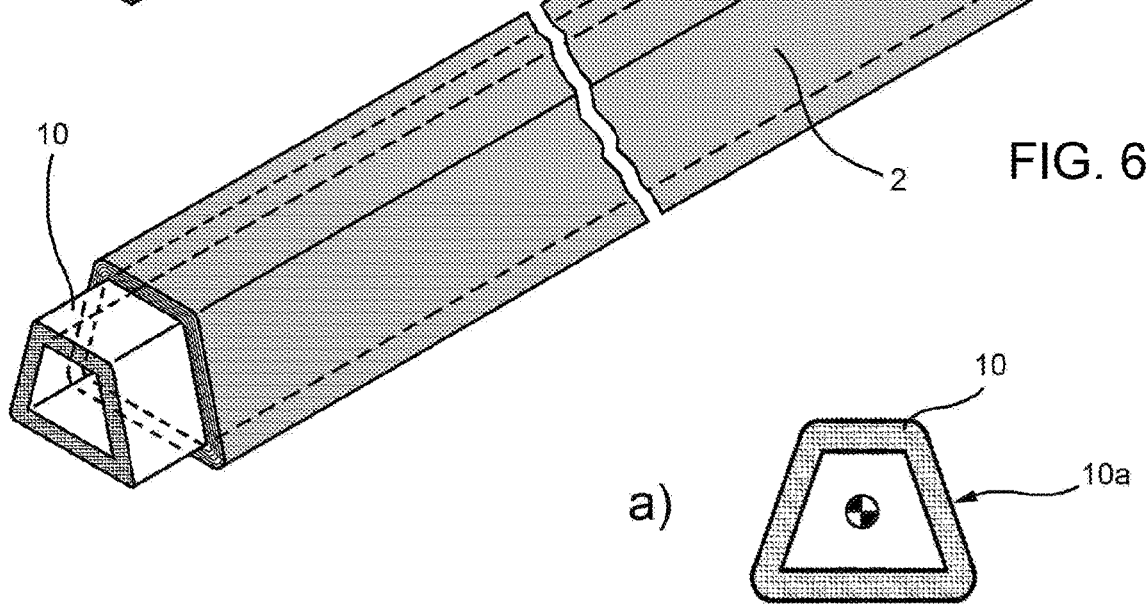
FIG. 6
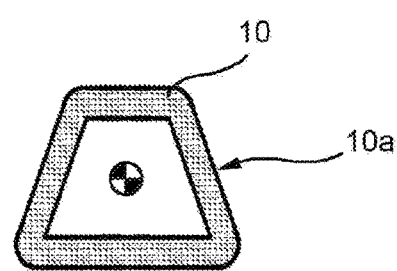
a)
FIG. 7
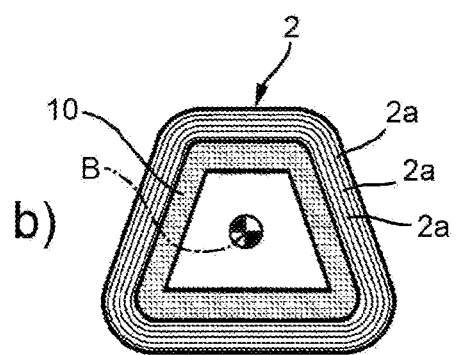
b)

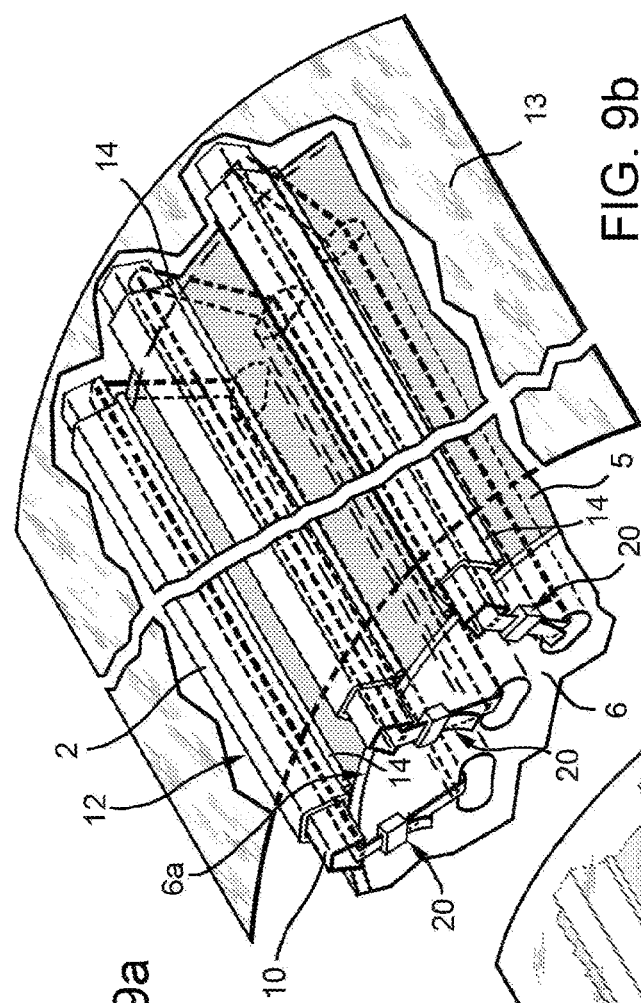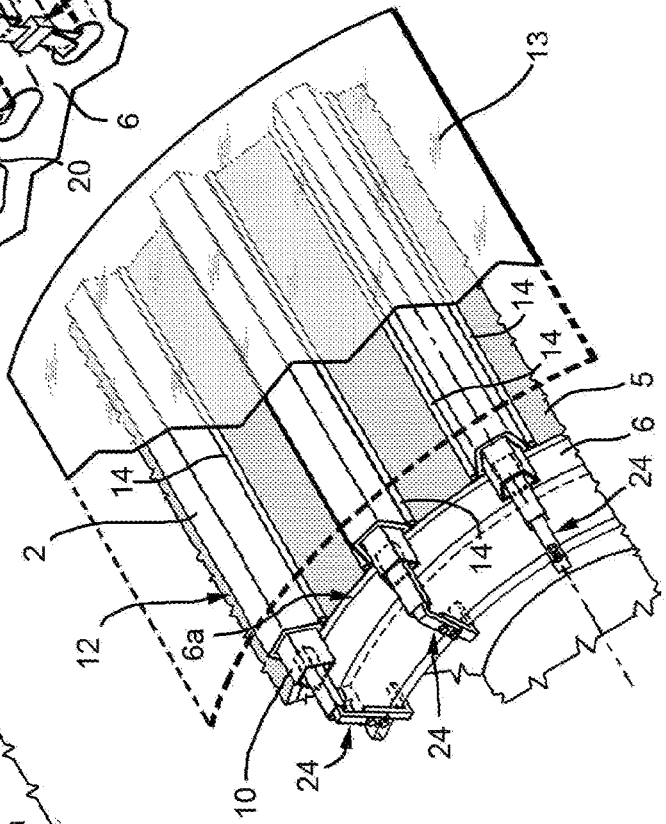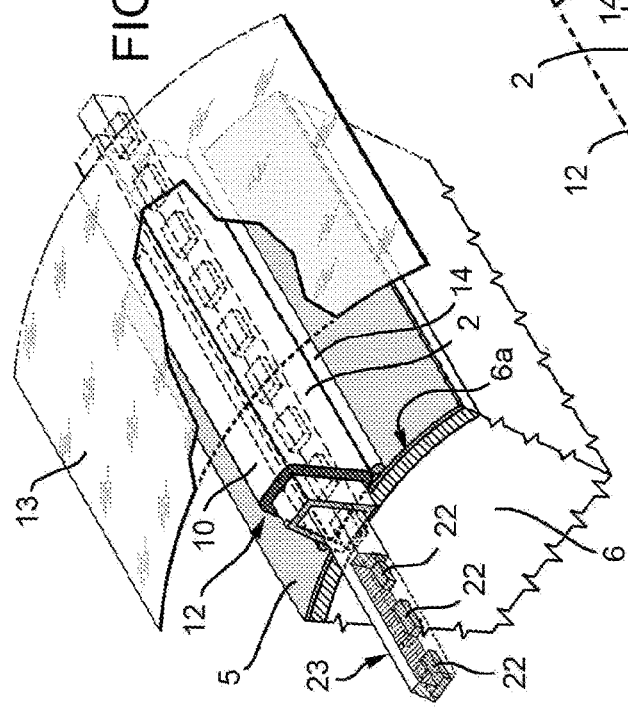

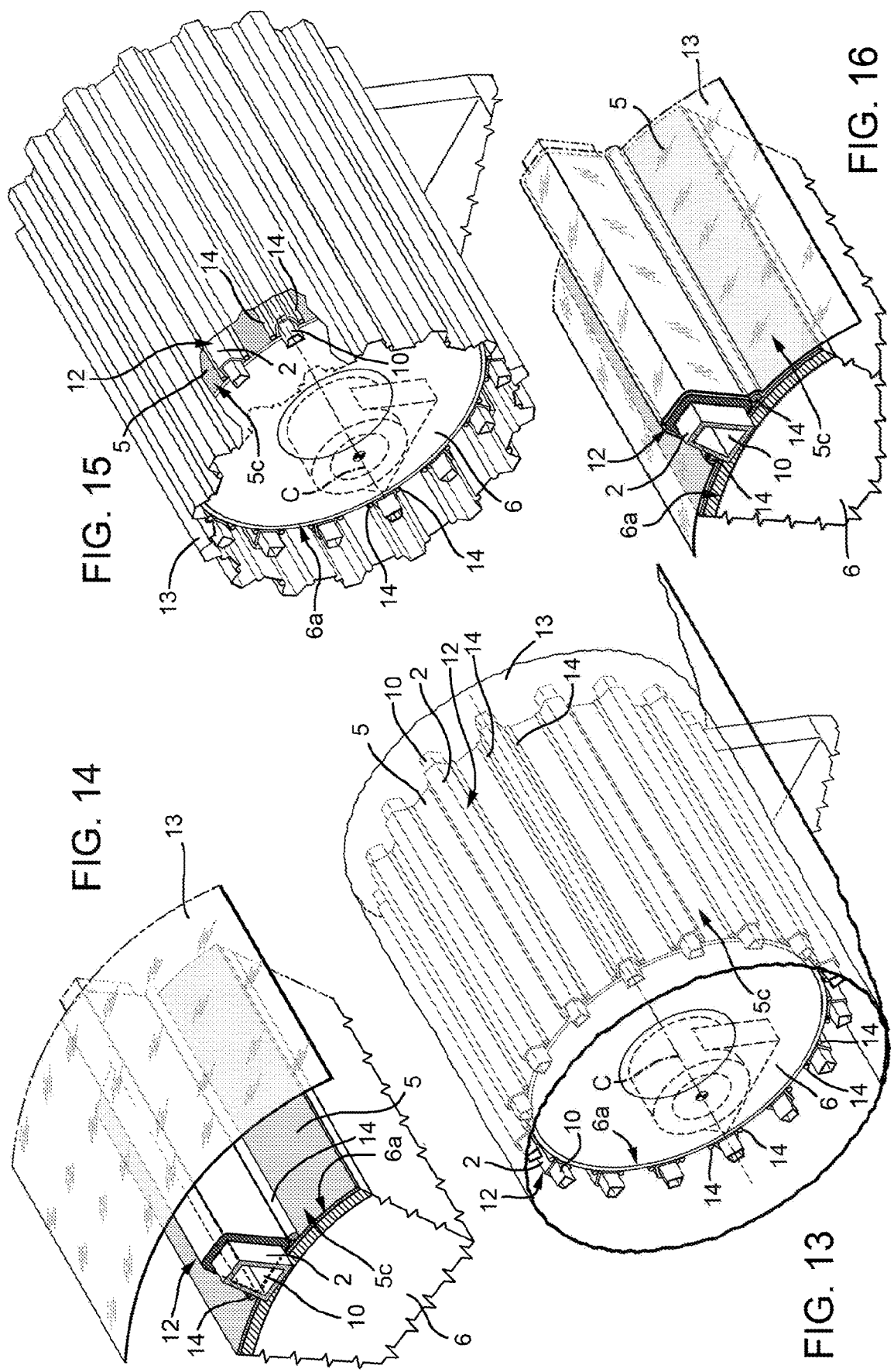

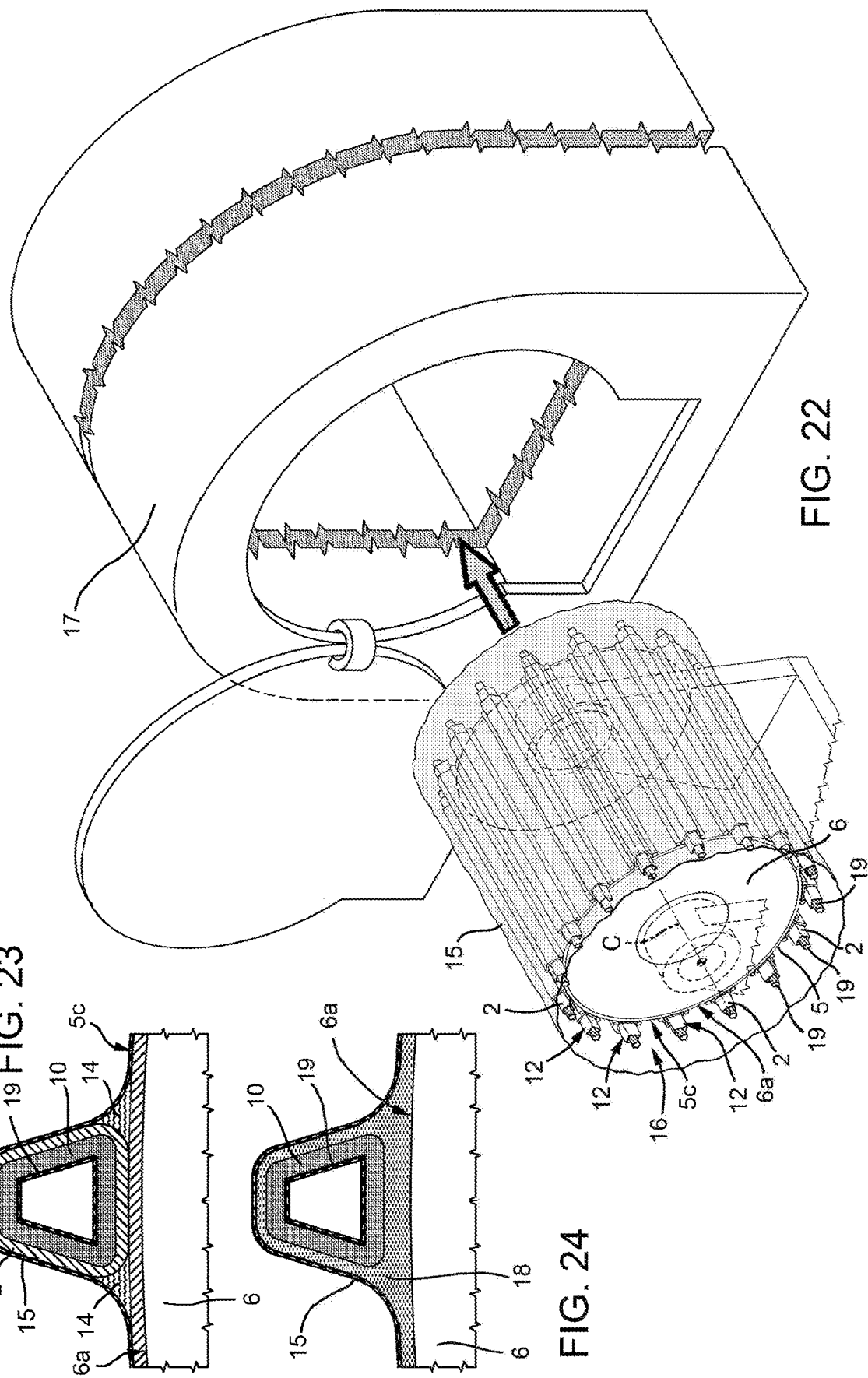

METHOD FOR THE MANUFACTURE OF A STRUCTURAL COMPONENT IN COMPOSITE MATERIAL REINFORCED WITH STIFFENING STRINGERS AND STRUCTURAL COMPONENT

CROSS-REFERENCE TO RELATED APPLICATIONS

This patent application is a U.S. national stage application under 35 U.S.C. § 371 of PCT Application No. PCT/IB2021/062160, filed on Dec. 22, 2021, which claims priority from Italian patent application no. 102020000032490 filed on Dec. 28, 2020.

TECHNICAL SECTOR

The present invention relates to a method for the manufacture of a structural component in composite material reinforced with stiffening stringers: in particular a structural component of a vector, e.g. a space module or a super-fast train.

The present invention also relates to a structural component in composite material reinforced with stiffening stringers, in particular a structural component of a vector, e.g. a space module or a super-fast train.

In particular, the present description will explicitly refer to the manufacture of a space module shell, the "shell" meaning the tubular external structure delimiting the internal environment of a space module, for example a module of a spacecraft, without thereby losing generality.

STATE OF THE ART

Structural components used in the aviation field, such as aircraft fuselages and parts thereof, made of composite material, are known.

In the state of the art, there are aeronautical structural components that are produced in light alloy and, therefore, in metal material, which will then form the fuselage of the aircraft.

As it is known, the fuselage must provide adequate protection for the payload (crew, passengers, cargo, etc.), but at the same time not exceed the desired weight limits.

Thus, the use of metal components, in return for greater strength, leads to an increase in total costs.

This results in the need for structural components in composite materials in order to reduce the overall weight of aircrafts. In fact, the use of composite material allows to reduce the overall weight of aircrafts and to obtain at the same time very strong structures.

Typically, the above structural components, e.g. fuselages or parts thereof, are made by joining a skin made of composite material with a plurality of stiffening stringers also of composite material and conveniently positioned parallel to a longitudinal extension direction of the fuselage.

In particular, each stringer is usually defined by a thin-walled longitudinal profile, comprising:
  a central portion which is normally concave and having a predetermined cross-section, e.g. rectangular, polygonal, arc of a circle, semi-ellipsoidal, semi-oval, etc.; and
  two longitudinal lateral portions, or wings, extending from opposite sides of the central portion, with respect to a direction transversal to the longitudinal direction of the stringer.

The stringers most commonly used in the field have an omega-shaped cross-section.

In the most widespread solutions, the composite material used consists of fibre material, e.g. carbon fibre, non cured or pre-cured, which is generally pre-impregnated with fluid resin according to a well-known process (e.g. by means of the method known as "Resin Transfer Moulding" or RTM).

In particular, each layer of composite material normally consists of a thermosetting (resin) matrix prepreg reinforced with fibres of various kinds such as carbon fibres, aramid fibres, glass fibres, etc.

In order to produce the skin, a plurality of layers of said non cured or pre-cured composite material are laminated together.

Similarly, in order to produce the stringers, a plurality of layers of non cured or pre-cured composite material is placed on a suitably shaped forming tool.

Once the skin and stringers have been manufactured, the stringers are brought into contact with the skin at their respective wings to form a set of closed profile cavities between the central concave portion of each stringer and the skin itself.

The assembly thus formed then undergoes a curing process by applying high pressure and temperature so as to cure the composite material, compact the above-mentioned layers together and have the stringers join the skin, while maintaining the above-mentioned cavities.

In practice, each stringer is applied rigidly and integrally to one face of the skin, normally the face defining the inner wall of the skin, i.e. the one facing, in use, the inside of the fuselage.

The structural component is thereby produced. Joining the skin and the stringers can be performed in several ways.

A mode known as "Inner Mould Line" or IML, provides the use of a curing tool, often referred to as a "spindle", which is externally shaped so as to define the internal surface of the structure or portion of the structure to be realised, for example the fuselage or portion of fuselage. In practice, the spindle has respective longitudinal cavities, each one adapted to house a stiffening stringer.

Once the stringers have been positioned in the aforesaid spindle cavities, various types of inserts, known in the field as "bladders" and "noodles", are inserted into the various cavities that are formed as a result of positioning the stringers on the spindle; these inserts are adapted to hold the various components in position and to prevent them from being crushed due to high pressure during the subsequent curing step.

At this point, the assembly consisting of the spindle, stringers and inserts is covered with the relative portion of skin that will form the outer surface of the aforesaid portion of fuselage.

Therefore, in the resulting assembly, the spindle defines the innermost component.

At this point, the entire assembly is brought into the autoclave for a high temperature and high pressure curing operation, whereby the stringers are firmly coupled and integrated into the skin.

In light of the foregoing, the external surface of the component is defined by the smooth external surface of the skin, while the internal surface of the component, i.e. the one facing the interior environment of the vector, is defined by the shaped inner surface of the skin, to which the stringers are integrally fixed.

US2015/122413A1, DE102009056978A1 and EP2998228A describe respective methods and apparatuses for manufacturing an aeronautic structural component in composite material reinforced with stiffening stringers in accordance with the foregoing.

The use of composite materials in the aerospace field is increasingly widespread, and this description will refer to them without losing its generality.

In this field, the use of components in composite material is dictated by the need to reduce the overall weight of space vehicles and modules.

In particular, there is a need for the space module shell, i.e. the external tubular structure delimiting the internal environment of the space module, such as the shell of a satellite or a space capsule, to be made of composite material.

This shell must ensure a proper protection for the payload (sensors, supplies, crew, etc.), but at the same time it must not exceed the weight limits imposed by the fact that putting a space module into orbit is very expensive, so any reduction in weight implies a significant reduction in costs.

With particular reference to the aerospace field, the need is therefore perceived to produce structural components in composite material, in particular shells or portions thereof, of space vehicles or modules, which have adequate resistance to compression, due to the fact that such modules operate in vacuum, to the strong stresses (e.g. sudden accelerations) to which the module is subjected during launch, and also characterised by an adequate resistance to impacting bodies, such as micrometeorites or space debris derived from human activities.

This last aspect is becoming increasingly important, as many of the Earth's orbits have been invaded by space debris generated by countless human activities in recent years, ranging in size from a few millimetres to quite large objects that can damage the vehicles or space modules that occupy such orbits.

OBJECT AND SUMMARY OF THE INVENTION

Aim of the present invention is therefore to provide a method for the manufacture of a structural component in composite material reinforced with stiffening stringers, which enables to satisfy simply and cost-effectively the requirements specified above and related to structural components in composite material used in space vehicles or modules.

According to the invention, this aim is achieved by a method for manufacturing a structural component reinforced with stiffening stringers as claimed in Claim 1.

A further aim of the present invention is to design a structural component in composite material reinforced with stiffening stringers, which makes it possible to satisfy simply and cost-effectively the requirements specified above and related to the structural components in composite material used in space vehicles or modules.

According to another aspect, this aim is achieved by a structural component in composite material reinforced with stiffening stringers as defined in the claims.

BRIEF DESCRIPTION OF THE DRAWINGS

For a better understanding of the present invention, some preferred non-limiting embodiments are described below, purely by way of example and with the aid of the attached drawings, in which:

FIG. 1 is a perspective view, with parts removed for clarity, of a vector, in particular a spacecraft, having an outer shell consisting of two structural components made by the manufacturing method according to the present invention;

FIG. 2 is a perspective view, with parts removed for clarity, of one of the structural components in FIG. 1;

FIGS. 5 and 7a show, in perspective and side view respectively, an expandable insert used in the method according to the present invention;

FIGS. 6 and 7b show, in perspective and side view respectively, a reinforcing element of the structural component 1 according to the present invention;

FIG. 9a shows in a perspective view a first embodiment of a step of the method according to the present invention;

FIG. 9b shows in a perspective view a second embodiment of a step of the method according to the present invention;

FIG. 9c shows in a perspective view a third embodiment of a step of the method according to the present invention;

FIGS. 13 to 16 schematically show in a perspective view two subsequent steps of the method according to the present invention;

FIG. 22 schematically shows in a perspective view a step of the method according to the present invention; and FIGS. 23 and 24 show in a sectioned view a detail of the structural component before and after performing the step of FIG. 22 respectively.

DETAILED DESCRIPTION

Figure 4:
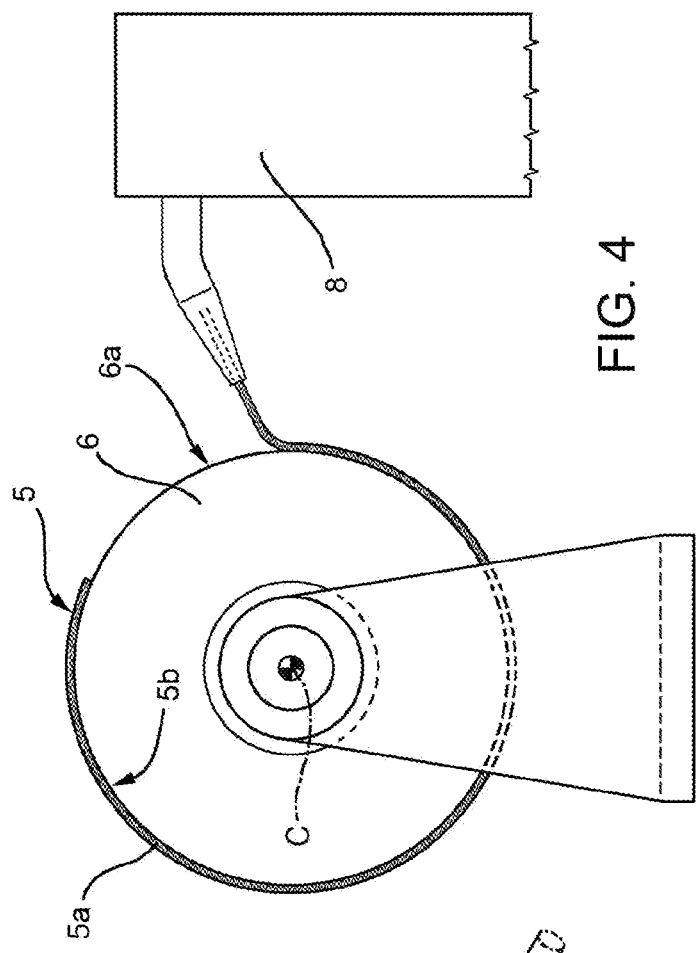
FIGS. 3 and 4 schematically show, in perspective and side view respectively, two respective subsequent steps of the method according to the present invention.

With reference to FIGS. 1 and 2, reference 1 indicates as a whole a structural component made of composite material reinforced with stiffening stringers 2 and defining, in use, at least part of an outer shell 3 of a vector 4 and comprising a composite skin 5 in composite material and a plurality of composite stringers 2 in composite material having a hollow section and rigidly and integrally attached to the skin 5.

In particular, the present description will explicitly refer, without thereby losing generality, to a structural component 1 used in the aerospace field, for example an outer shell 3 of a spacecraft or a space module, or a portion of such shell 3, and to a process for manufacturing such a shell 3 or portion of a shell 3.

More particularly, the component 1 described and shown herein defines a cylindrical modular portion of the outer shell 3 of the vector 4, which is defined, in this preferred and non-limiting embodiment, by a spacecraft or a spacecraft module (i.e. a portion of said spacecraft intended for storing and transporting a payload), to which the present description will explicitly refer, without thereby losing generality.

More precisely, "outer shell" means the protective shell that separates the internal environment of the vector 4 (i.e. the space module) from the environment external thereto, delimiting its content.

For example, in the case of an aircraft, such shell 3 is defined by the fuselage. In the case of a train, in particular a super-fast train, the shell 3 is defined by the outer shell defining the body of each carriage or locomotive.

It should also be noted that the structural component 1 could be defined by a part or portion, for example a panel (not shown), of such shell 3, comprising precisely a portion of skin 5 to which stringers 2 are rigidly and integrally fixed, in the manner described hereinafter.

According to the preferred, non-limiting embodiment described and shown herein, the component 1 has a cylindrical shape around a longitudinal axis A.

In particular, the shell 3 of the vector 4 of FIG. 1 consists of two cylindrical structural components 1 arranged in series and joined together at an axial annular wall.

The component 1 comprises a skin 5 in composite material and a set of hollow longitudinal stiffening stringers 2, preferably with a closed section, configured to reinforce and stiffen the panel.

Each stringer 2 has a significantly greater extent in one longitudinal direction than the extent in the other two directions orthogonal to such longitudinal direction.

The aforementioned longitudinal direction of extension of the stringers 2 is also in use (i.e. in mounting/assembly conditions) parallel to the axis A of the shell 3 formed at least in part by the structural component 1.

In other words, each stringer 2 has a longitudinal axis B (FIG. 7b) parallel, in use, to the axis A of the shell 3, i.e. the skin 5.

The use of structural components in composite materials is dictated by the need to reduce the overall weight of spacecrafts or space modules.

In one embodiment, the composite material consists of fibre material, e.g. non-cured or pre-cured carbon fibre.

In one embodiment, such material is pre-impregnated with fluid resin according to a well-known process that is not described in detail (e.g. by the method known as "Resin Transfer Moulding" or RTM).

In practice, each layer of composite material is normally made up of a thermosetting (resin) matrix prepreg reinforced with fibres of different kinds such as carbon fibres, aramid fibres, glass fibres, etc.

The present invention relates to a process for manufacturing the structural component 1, which is obtained by rigidly and integrally applying the stringers 2 to the skin 5, preferably so that each stringer 2 delimits with the skin 5 itself a closed profile hollow section.

In particular, the present description will explicitly refer to the manufacture of a hollow cylindrical (i.e. tubular) component 1, without losing generality.

However, the structural and functional characteristics and process steps are equally applicable to the manufacture of a single panel extending along a flat, curved or rotationally curved lying surface, e.g. along a substantially parabolic, vaulted or, still a (substantially) cylindrical or truncated-cone surface.

Thus, in the present case the skin 5 will have a (substantially) cylindrical shape having a central longitudinal axis corresponding to the axis A. The stringers 2 will be arranged with their respective longitudinal axes B parallel to the axis A.

In addition, the present description will explicitly refer, without loosing generality, to a manufacturing process of the type known as "Inner Mould Line" or IML.

However, the steps of the process are equally applicable, mutatis mutandis, in the case (not shown) wherein the structural component is manufactured according to a process of the type known as "Outer Mould Line" or OML, which is known in itself and not described in detail.

Referring to FIG. 4, the skin 5 is obtained by arranging first layers 5a (only one of which is shown in FIG. 4) of non cured or pre-cured composite material on a cure tool 6, commonly known as a "spindle", which has, in the non-limiting example described herein, a substantially cylindrical shape and has a longitudinal central axis C.

In practice, in order to form the skin 5 the manufacturing method comprises the step of laminating a plurality of first layers 5a of non cured or pre-cured composite material onto an outer surface 6a of the tool 6, so that a first face 5b (FIG. 2) of the skin 5 defining, in use, the internal surface of the component 1 facing the internal environment of the vector 4 is facing the external surface 6a of the tool 6.

Conveniently, the outer surface 6a is smooth, i.e. it is not shaped, i.e. it has no surface macro-features adapted to define a groove or cavity appreciable to the naked eye.

Accordingly, the lamination is carried out by arranging the layers 5a on the smooth surface 6a of the tool 6.

Figure 3:
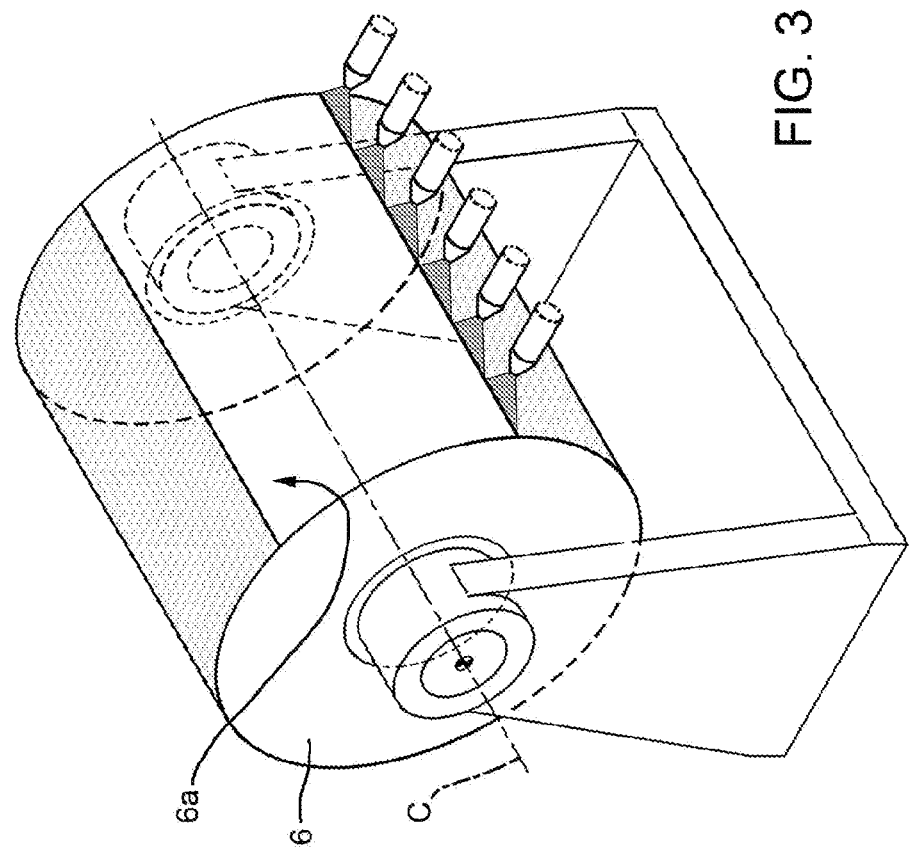

Advantageously, prior to laminating the layers 5a on the tool 6, the method comprises the step of applying, in particular sprinkling, an adhesive substance 7, for example an adhesive or sticky resin, to the external surface 6a, as shown in FIG. 3.

The presence of the adhesive substance 7 on the external surface 6a of the tool 6 further improves the adhesion of the layers 5a of composite material during lamination thereof.

Preferably, prior to laminating the layers 5a on the tool 6 and subsequently applying the adhesive substance 7 on the tool 6, the method comprises the advantageous step of applying a gas barrier material layer.

In detail, the layer of material that is impenetrable or substantially impenetrable to gases could be defined by a skin of EVOH (Ethylene-Vinyl-Alcohol) or PVDF (Polyvinylidene Fluoride) or other polymeric and/or metallic materials suitable for the purpose.

Conveniently, in accordance with an advantageous step (not shown) of the manufacturing method according to the present invention, a further layer of adhesive substance 7 could be applied above the layer of material that is impenetrable or substantially impenetrable to gases.

Alternatively, a single layer of material that is impenetrable or substantially impenetrable to gases could be applied externally to the cured assembly obtained after the curing (or co-bonding) process, which will be described hereinafter.

Preferably, the arrangement and thus the lamination of the layers 5a of composite material on the tool 6 is carried out by means of an automatic machine 8 known in itself and not described in detail, usually termed as "AFPM" (Automated Fiber Placement Machine).

In an alternative embodiment, the arrangement of the layers 5a is done manually.

During the arrangement of each layer 5a, the tool 6 is placed in rotation about its own axis C.

With reference to FIGS. 5, 6 and 7, each stringer 2 has a longitudinal axis B as described above.

In particular, each stringer 2 is made by arranging a plurality of second layers 2a of non cured or pre-cured composite material on a shaped portion of a respective hollow expandable insert 10 (commonly known as a "bladder").

More particularly, each insert 10 has an elongated longitudinal shape, has open opposite axial ends and has a closed profile hollow section, which, according to the example described, has a substantially trapezoidal shape.

In order to form the stringers 2, the method according to the invention comprises the step of laminating respective pluralities of second layers 2a on respective inserts 10 to form a plurality of stringers 2 each one having a respective axis B, such that each stringer 2 is wound on an outer surface 10a of the respective insert 10 so as to determine a longitudinal cavity 11 of each stringer 2, engaged by the respective insert 10.

Preferably, the layers 2a are arranged so as to completely wrap around and cover the external surface 10a of the insert 10.

Thus, according to the non-limiting example described herein, each stringer 2 has a closed profile hollow section with a trapezoidal shape.

Each insert 10 is made of an elastically deformable material and is expandable during the subsequent curing process of the component 1, in order to maintain the cavity 11, as will be explained in more detail hereinafter.

According to an alternative embodiment not shown, each stringer 2 is formed by partially wrapping the layers 2a around the respective insert 10, for example obtaining a section having an omega shape, with a central portion and two wings extending transversely from the central portion. In this case, the closed profile hollow section of the stringers 2 is obtained once the stringers 2 are attached to the skin 5.

For example, the stringers 2 might have an omega cross-section or be semicircular in shape.

According to an alternative embodiment not shown, each stringer 2 may be wound on the respective insert 10 so as to have a T- or L-shaped cross-section. In this case, once positioned on the skin 5, the stringers 2 will each define an open profile cross-section, and not closed as in the previous case. Moreover, in this case, in order to attach the stringers 2 to the skin 5, a co-bonding or co-curing process is carried out.

As visible in FIG. 6, a set of reinforcing elements 12 is thus obtained, each one defined by a stringer 2 housing in its cavity 11 a respective insert 10, or defined, each one, by a stringer 2 wound on a respective insert 10.

Figure 9:
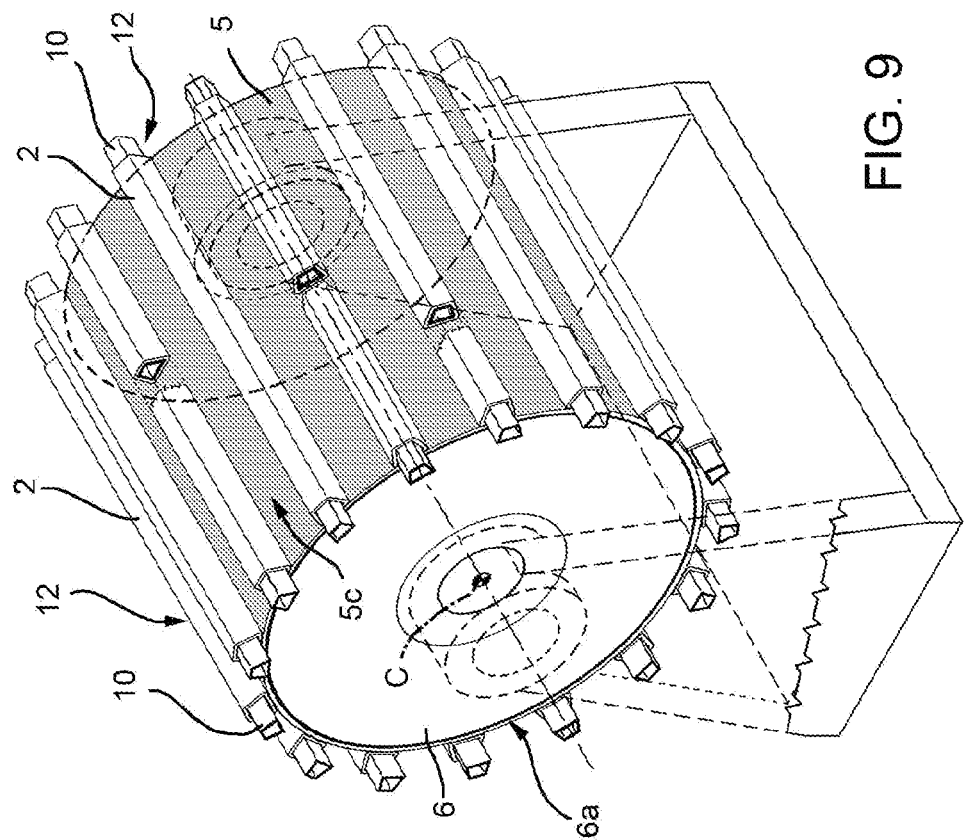
FIGS. 8 and 9 schematically show in a perspective view two subsequent instants of a step of the method according to the present invention.
Figure 8:
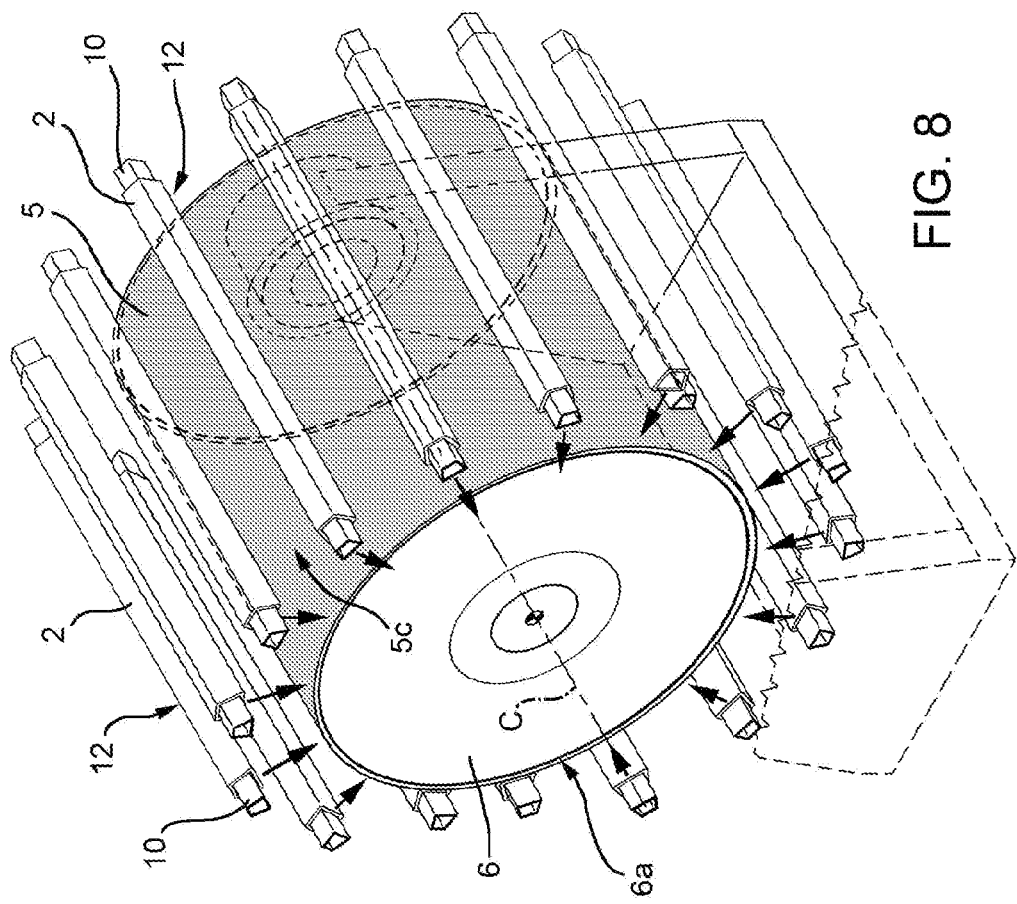

With reference to FIGS. 8 and 9, in order to carry out the structural shape of the component 1, the method comprises the step of positioning each reinforcing element 12 on a second face 5c of the skin 5 opposite to the first face 5b and defining, in use, the external surface of the component 1 facing the environment external to the vector 4, and so that the cavities 11 of each stringer 2 face towards said second face 5c.

Conveniently, such step of positioning is carried out by placing the reinforcing elements 12 on the second face 5c of the skin 5 in respective positions angularly equally-spaced with each other about the axis C and with the respective longitudinal axes B of the stringers 2 parallel to each other and to the axis C.

In an alternative embodiment not shown, the reinforcing elements 12, and thus the stringers 2, are arranged not equally-spaced about the axis C.

In a further embodiment, the reinforcing elements 12, and thus the stringers 2, are arranged with their respective longitudinal axes B not parallel to each other and to the axis C.

In light of the foregoing, the reinforcing elements 12, and therefore the stringers 2, are applied, i.e. attached, to a face of the skin 5 defining, in use, the external surface of the component 1, i.e. the surface of the component 1 facing in use the environment external to the vector 4, and not the internal surface.

The method also comprises the step of holding, i.e. maintaining, each reinforcing element 12 on the second face 5c of the skin 5 in the respective fixed position with respect to the tool 6.

Such step of holding is preferably carried out by arranging at least one holding element 20, 22, 24, 26 at each reinforcing element 12 in order to hold the reinforcing elements 12 themselves in their respective fixed positions with respect to the tool 6.

The holding modes will be described in greater detail hereinafter.

In order to ensure effective adhesion of the stringers 2 to the skin 5, layers 5a and layers 2a of composite material are compacted together.

To this end, with reference to FIGS. 13 to 16, a vacuum bag 13 is wrapped around the assembly obtained so far (FIGS. 13 and 14), so as to house the tool 6, the skin 5 and the reinforcing elements 12.

Once the vacuum bag 13 is sealed, a vacuum is applied to the inside of the latter. Compaction of layers 5a with layers 2a is thereby carried out (FIGS. 15 and 16).

After this compaction step, and thanks to the fact that the composite material is pre-impregnated with the aforementioned resin, the reinforcing elements 12, i.e. the stringers 2, remain fixed in their respective positions on the second face 5c of the skin 5, even after the removal of the aforementioned retaining elements 20, 22, 24, 26.

Figures 11, 12:
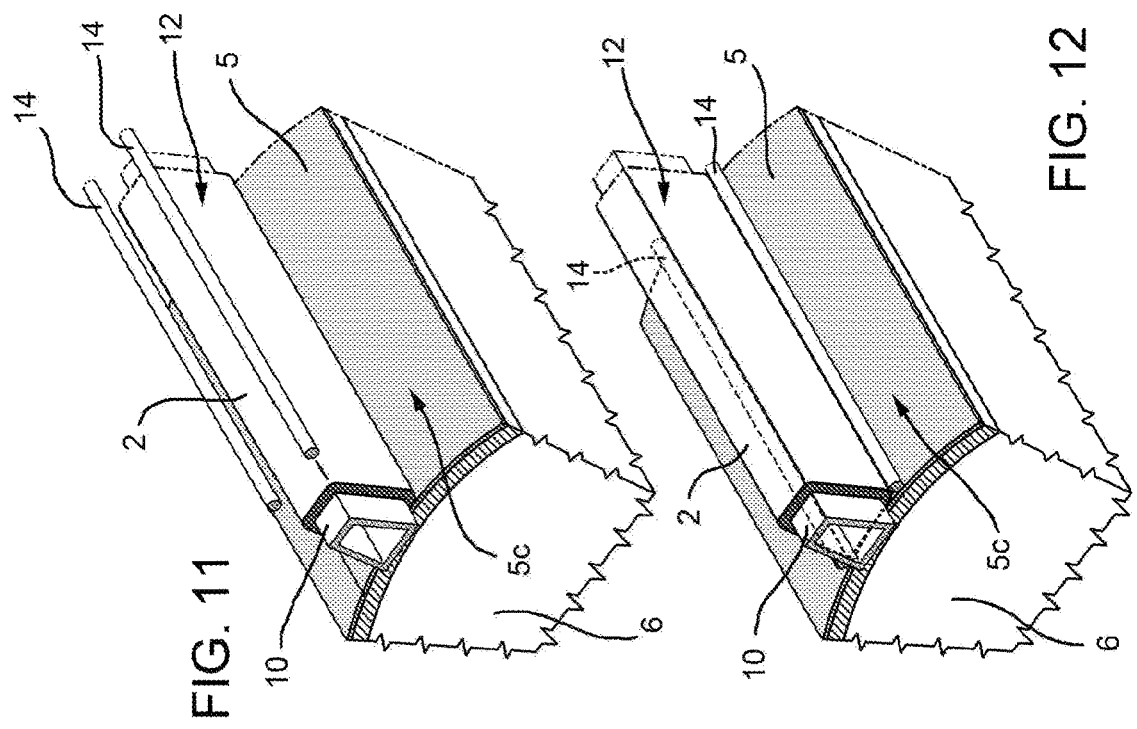
FIGS. 10, 11 and 12 schematically show in a perspective view a step of the method according to the present invention.
Figure 10:
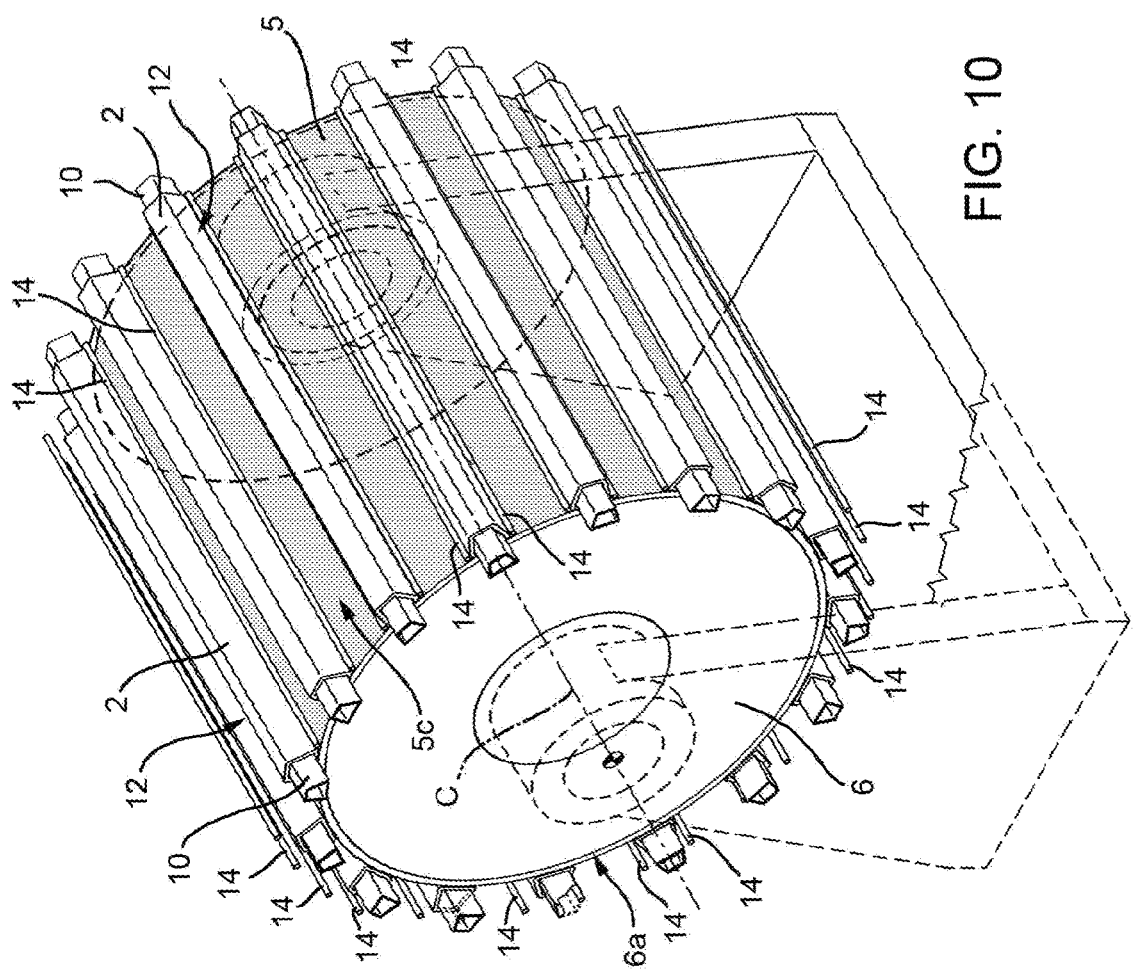

With reference to FIGS. 10, 11 and 12, the method preferably, but not necessarily, comprises the step of placing, subsequent to the step of retaining each reinforcing element 12 on the second face 5c of the skin 5 and prior to the application (wrapping) of the vacuum bag 13 around the hitherto obtained assembly, further longitudinal inserts 14 on the second face 5c of the skin 5.

In particular, the further inserts 14 are commonly known as "noodles" and are defined by bars, preferably of circular cross-section, made of composite material, more specifically adhesive composite material, more particularly pre-preg composite material and non cured or pre-cured.

As known in the art, the further inserts 14 act as fillers and are therefore configured to engage and fill the cavities and gaps defined between the stringers 2 and the skin 5 in assembly conditions.

Advantageously, as the inserts 14 are made of adhesive composite material, they do not need any retaining element to be held on the skin 5; otherwise, they are held in place by adhesion.

As visible in FIGS. 10, 11 and 12, the step of positioning the further inserts 14 is carried out by arranging, for each reinforcing element 12, a pair of further inserts 14, each one adjacent to a longitudinal side of the respective reinforcing element 12, parallel to the axis B of the respective stringer 2.

In other words, a pair of further inserts 14 is placed at the sides of each stringer 2.

Accordingly, the step of housing the assembly hitherto obtained within the vacuum bag 13 further comprises housing the further inserts 14 in the vacuum bag 13 itself.

Therefore, the aforementioned compaction of the layers 5a with the layers 2a carried out applying vacuum inside the vacuum bag 13 also includes the compaction of each pair of further inserts 14 in their positions adjacent to the respective stringer 2, so that such pair of further inserts 14 is compacted to the second layers 2a forming the respective stringer 2 and to the first layers 5a forming the skin 5 at the longitudinal sides of the respective reinforcing element 12.

Figure 17:
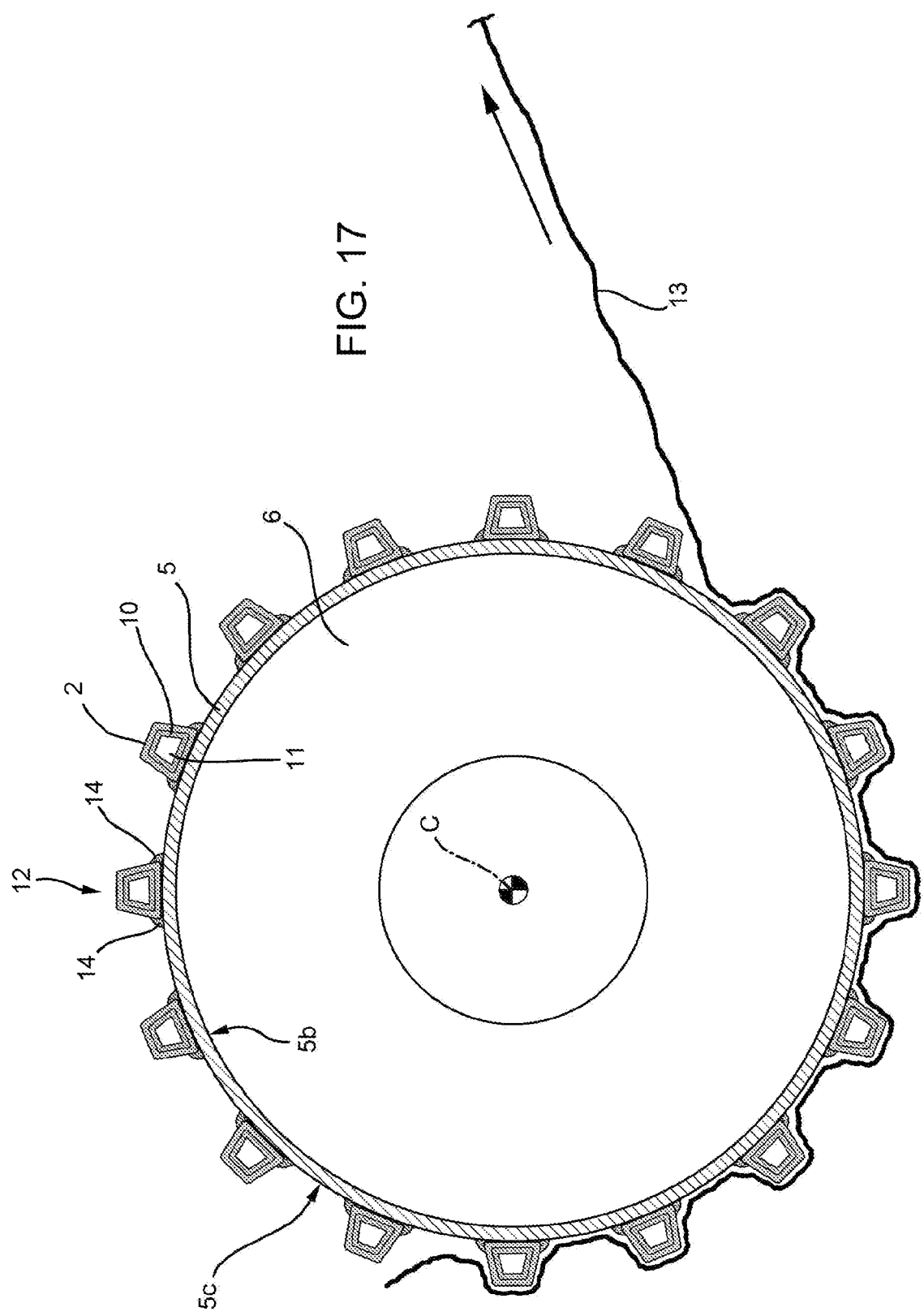
FIG. 17 schematically shows in a side view a step of the method according to the present invention.
Figure 18:
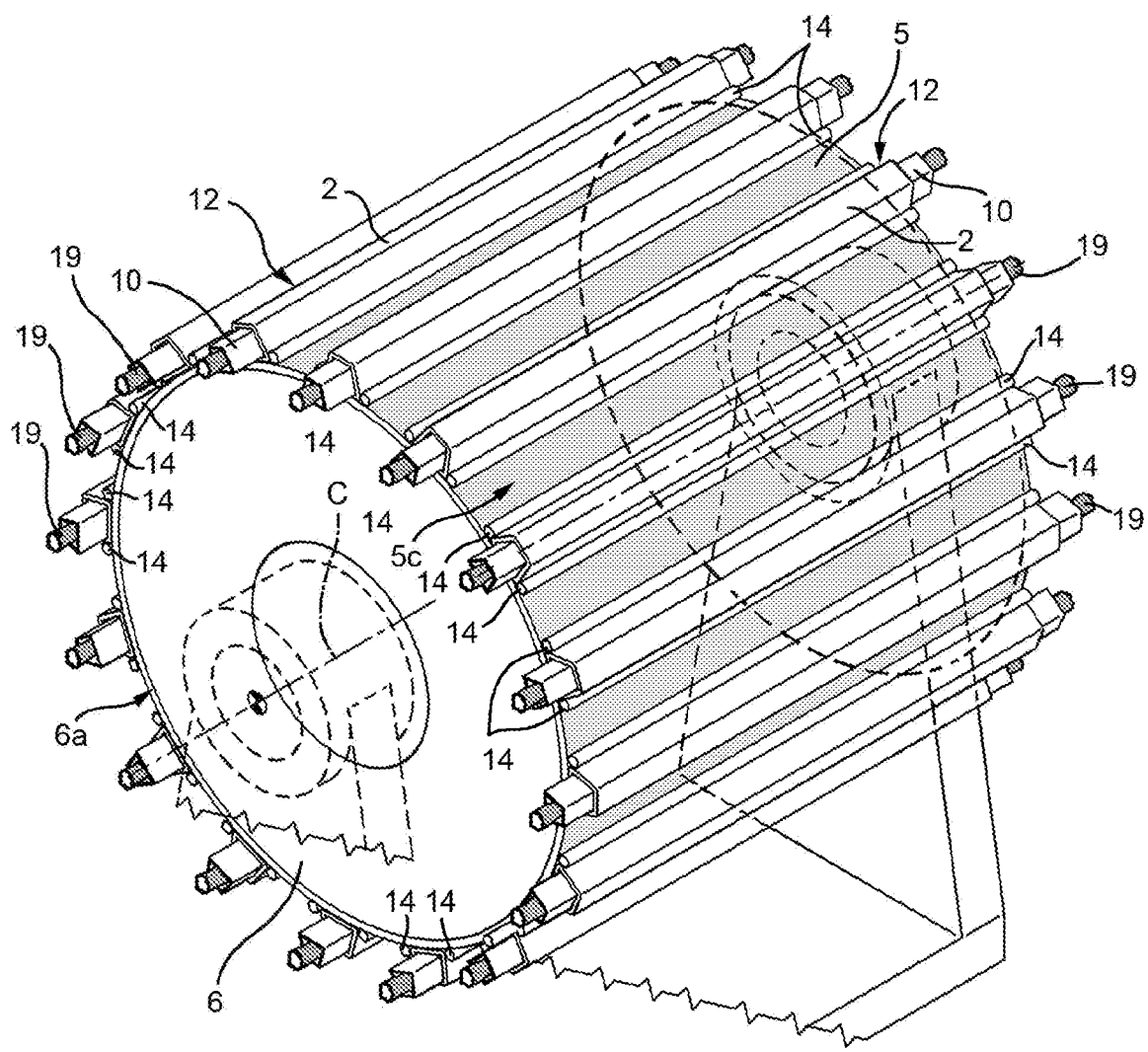
FIG. 18 shows in a perspective view a step of the method according to the present invention.
Figure 19:
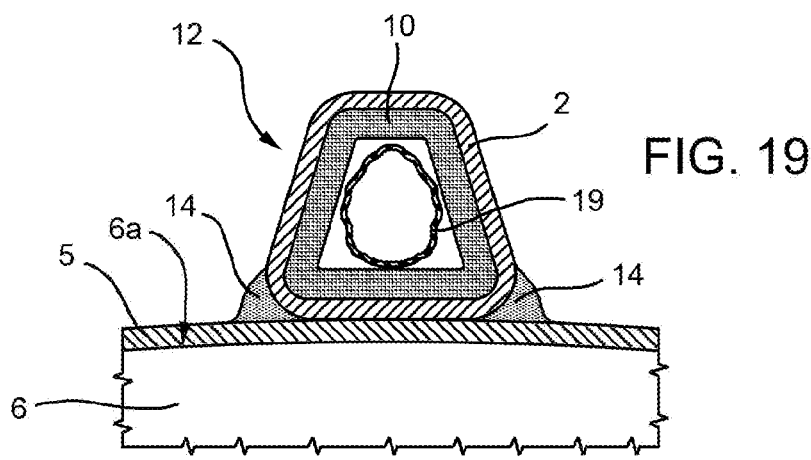
FIG. 19 shows in an enlarged scale and in a partially sectioned view a detail of the structural component during the step of FIG. 18 of the method according to the present invention.
Figure 20:
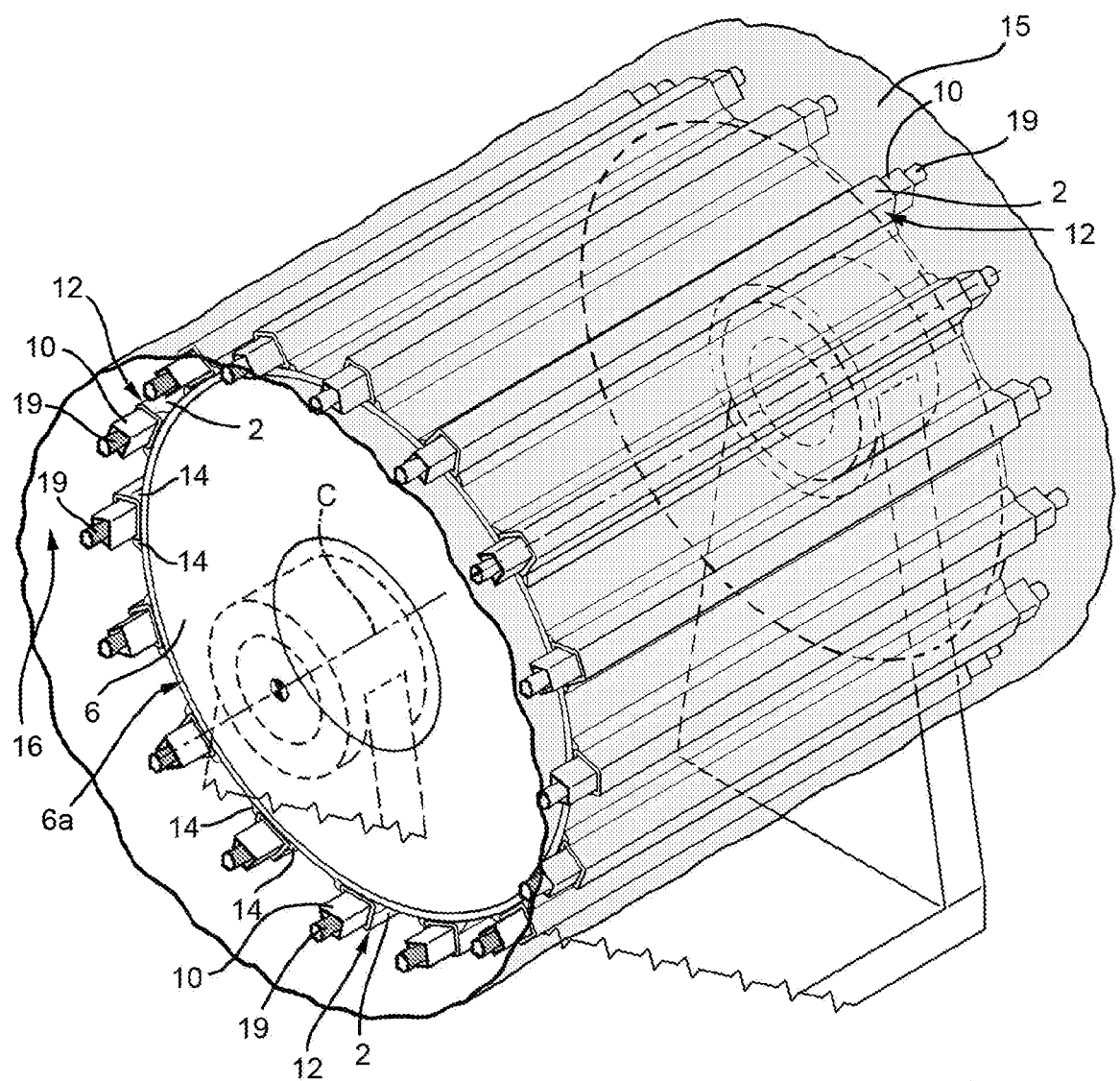
FIG. 20 shows in a perspective view a step of the method according to the present invention.
Figure 21:
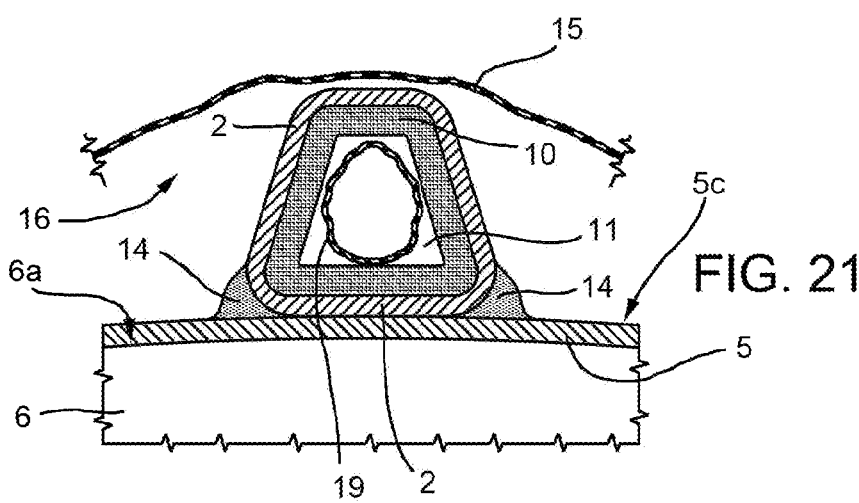
FIG. 21 shows in an enlarged scale and in a partially sectioned view a detail of the structural component during the step of FIG. 20 of the method according to the present invention.

Thus, at the end of the compaction step, the further inserts 14 are compacted together with the first layers 5a and the second layers 2a, as shown in FIG. 17.

Preferably, once the above compaction has been carried out, the vacuum bag 13 is removed (FIG. 17).

As visible in FIGS. 20 to 24, the assembly thus formed, i.e. the assembly comprising the tool 6, the skin 5, the reinforcing elements 12 and, where applicable, the further inserts 14, subsequently undergoes a curing process by applying high pressure and temperature, so as to cure the composite material, compact the aforementioned layers 5a and 2a together and have the stringers 2 join the skin 5, while maintaining the aforementioned cavities 11.

In particular, the curing process consists in applying high pressure and temperature (approximately 6 bars and 180° C.) to the above assembly.

In this respect, the method for the manufacture of the structural component 1 also comprises the steps of:
  housing, after completion of the above compaction, the tool 6, the skin 5, the reinforcing elements 12 and, where applicable, the further inserts 14, in an further vacuum bag 15 (FIG. 20);
  sealing the vacuum bag 15 to delimit a vacuum chamber 16 therein; and
  applying preset temperature and pressure (preferably about 6 bars and 180° C.) to the outside of the vacuum chamber 16, so as to cure the composite material and to determine rigid and integral attachment of the stringers 2 to the second face 5c of the skin 5 and, if present, of the further inserts 14 to the second face 5c and to the stringers 2.

In particular, after sealing the vacuum bag 15, the entire assembly is inserted in an autoclave 17, within which the above temperature and pressure conditions are applied (FIG. 22).

Inside the autoclave 17, the inserts 10 expand due to the application of high temperature, thus maintaining the cavities 11 and preventing them from being crushed by the high pressure applied.

By means of the curing process, the composite material is cured and we move from a condition wherein the skin 5, the stringers 2 and the inserts 14 are parts attached and compacted to each other (FIG. 23) to a condition wherein these parts define a single structure 18 made of cured composite material (FIG. 24).

The structural component 1 is thus obtained. The vacuum bag 15 is, at this point, removed and, preferably, the inserts 10 are removed, while the further inserts 14 remain, as said, included in the structure 18 of the component 1.

It should be noted that after removal of the inserts 10 following the curing process, each reinforcing element 12 is defined only by the relative stringer 2.

Conveniently, the vacuum bag 13 through which the compaction is carried out is removed prior to the above steps of the curing process.

Preferably, in order to improve the curing process, a respective pressurisation bag 19 is inserted, in particular after the above compaction, inside the cavity 11 delimited by each hollow insert 10.

Consequently, the bags 19 are also housed inside the vacuum chamber 16 defined by the vacuum bag 15.

The method further comprises the step of placing each bag 19 previously housed within the cavity of each insert 10 in fluidic communication with the inside of the autoclave 17, i.e. with a curing environment outside the vacuum chamber 16.

Therefore, during the curing process, the aforesaid preset temperature and pressure are also applied inside each bag 19.

Thereby, in the autoclave 17 and during the curing process, the bags 19 expand (FIGS. 23 and 24) further contributing to maintain the cavity 11 of each stringer 2.

According to the invention, the aforesaid step of holding each reinforcing element 12 on the second face 5c of the skin 5 in the respective fixed position with respect to the tool 6 may be carried out in various ways, some of which will be set-forth hereinafter.

According to a first embodiment, holding the reinforcing elements 12 in their respective fixed positions involves the use of belt elements 20 defining the aforesaid restraining elements, as shown in FIG. 9b.

In particular, the method comprises the steps of:
  inserting a belt element 20 through the cavity of each insert 10;
  attaching respective opposite ends of the belt element 20 to the tool 6; and
  fixing each reinforcing element 20 to the tool by means of the belt element 20 inserted inside the cavity of the respective insert 10 and fixed to the tool 6.

Conveniently, the tool 6 comprises cavities 21 adapted to be engaged, each one, by a respective belt element 20, in particular by the ends of the respective belt element 20 and within which cavity 21 the ends are attached to the tool 6 or to each other, to determine the engagement of the respective reinforcing element 12 to the tool 6 itself.

According to a further embodiment, holding the reinforcing elements 12 in their respective fixed positions involves the use of magnetic elements 22 (FIG. 9a).

In particular, in such a case, the tool 6 comprises a ferromagnetic portion made of ferromagnetic material and the method comprises the steps of:
  arranging at least one magnetic element 22 at each reinforcing element 12; and
  interposing the reinforcing element 12 between the respective magnetic element 22 and the tool 6, so as to hold the reinforcing element 12 in its position by means of magnetic interaction between the magnetic element 22 and the ferromagnetic portion of the tool 6.

In detail, each magnetic element 22 is defined by a permanent magnet.

In more detail, a magnetic band 23, i.e. a strip of polymeric or composite material carrying the magnetic elements 22 is inserted inside the cavity delimited by each insert 10. The magnetic interaction between the magnetic elements 22 of the band 23 and the ferromagnetic portion of the tool 6 holds the relevant reinforcing element 12 in position.

According to a further embodiment, the reinforcing elements 12 are retained by means of terminals 24 (FIG. 9c), which are fixed, each one, to a respective insert 10 and to the tool 6, so as to retain the respective reinforcing element 12 to the tool 6.

In view of the foregoing, the step of housing the assembly in the vacuum bag 13 further comprises housing within the vacuum bag the retaining elements, whether these are defined by the belt elements 20 or the magnetic elements 22 or the terminals 24.

Once the aforementioned compacting step has been carried out by means of the vacuum bag 13, the retaining elements 20, 22, 24 are removed, prior to the steps of the curing process, in particular prior to wrapping the further vacuum bag 15 on the assembly.

Due to compaction, the reinforcing elements 12 remain in their fixed positions even after removal of the retaining elements 20, 22, 24.

Figure 9D:
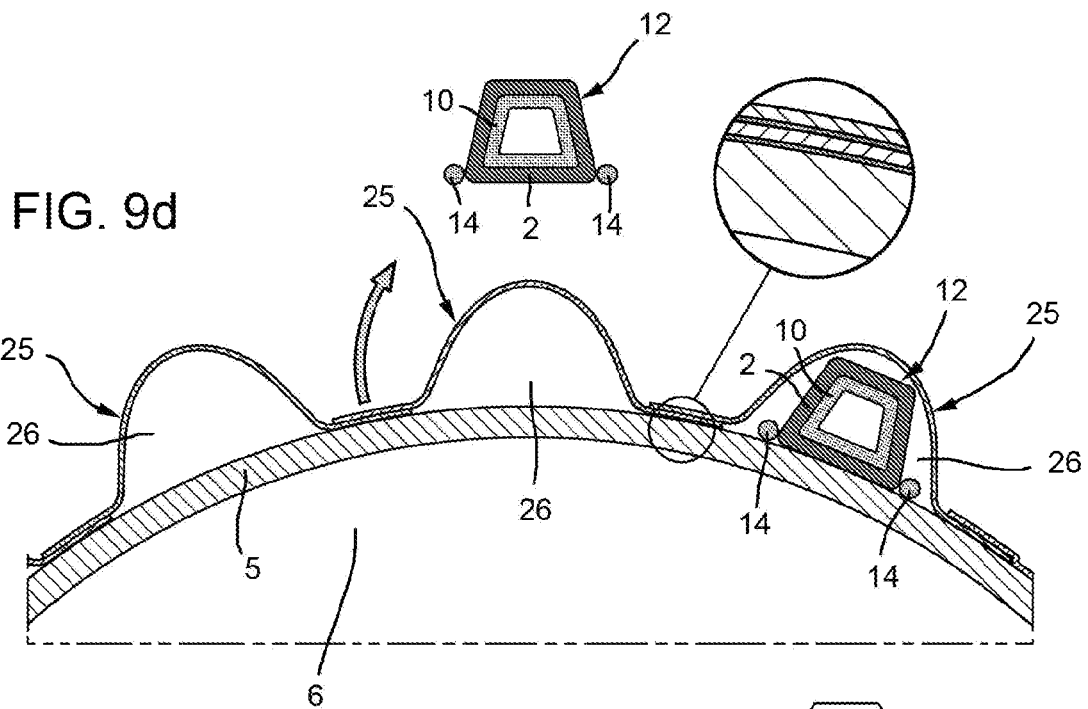
FIGS. 9d, 9e and 9f show in a side view a fourth embodiment of a step of the method according to the present invention.
Figure 9E:
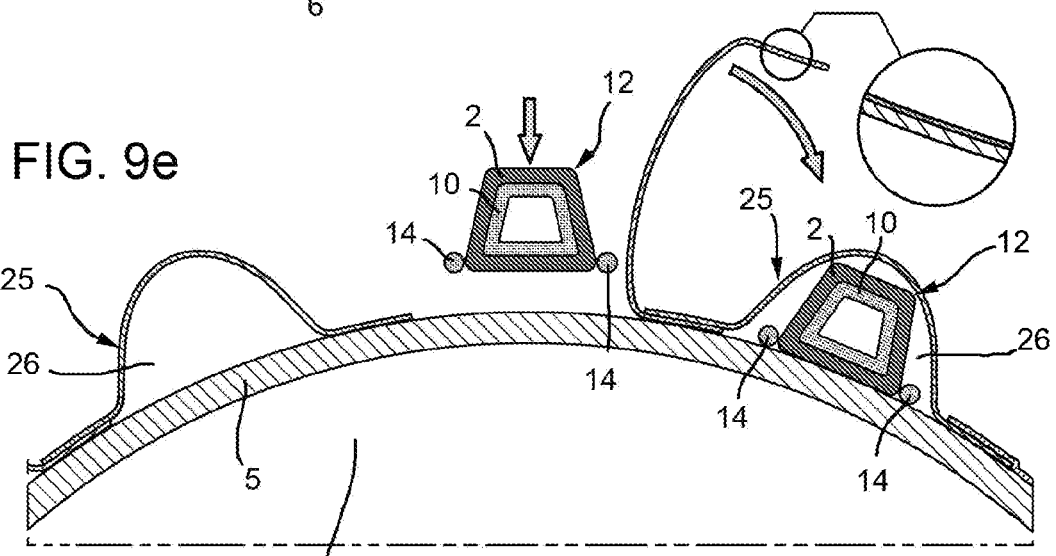
Figure 9F:
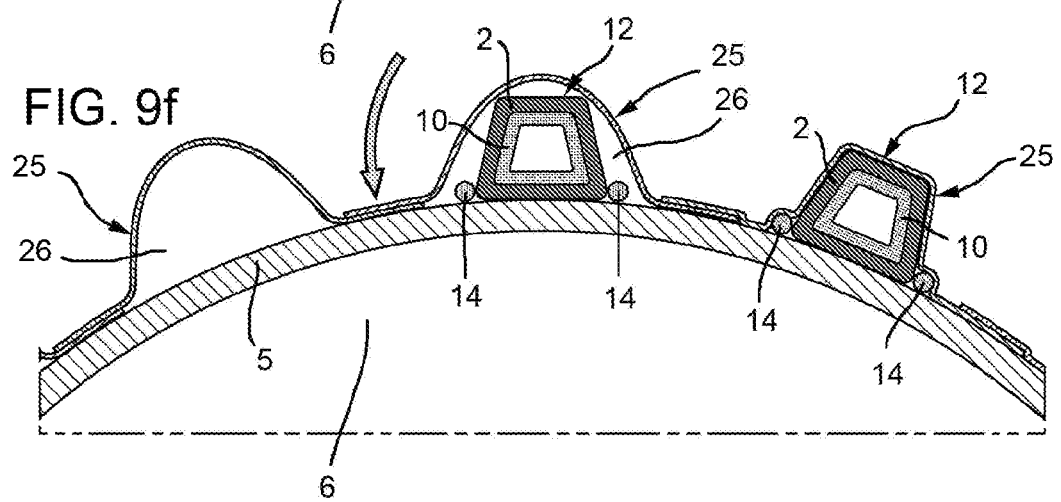

According to an alternative embodiment, the retention of the reinforcing elements 12 in their respective fixed positions involves the use of a vacuum bag 25 comprising a plurality of adjacent longitudinal pockets 26 fluid-tightly sealed together (FIGS. 9d, 9e, 9f).

In detail, in such a case the method comprises the step of wrapping said bag 25 comprising the pockets 26 around the skin 5 laminated on the tool 6, in particular prior to positioning the reinforcing elements 12 on the same skin 5.

Thereafter, the positioning of the reinforcing elements 12 is carried out by arranging each reinforcing element 12 inside a respective pocket 26, sequentially (FIG. 9d).

Thus, according to this embodiment, the step of housing the assembly inside the vacuum bag is carried out by means of the above-mentioned steps of wrapping the bag 25 and arranging the reinforcing elements 12 inside the pockets 26.

Thus, the vacuum bag 13 is defined, in this case, by the bag 25.

Each pocket 26 is then fluid-tightly re-sealed, e.g. by normal bag sealant, and vacuum is applied to the inside thereof.

A sequential compaction of the layers 5a and 2a and, where present, of the further inserts 14 is then carried out by applying vacuum within each pocket 26, sequentially.

Therefore, the step of holding the reinforcing elements 12 on the second face 5c of the skin 5 is carried out by means of the above compaction.

Preferably, the bag 25 is removed once compaction has been carried out for all the pockets 26, and prior to the steps of the curing process described above.

In this case, the retaining elements are defined by pockets 26.

Ultimately, by means of the above-described manufacturing method, a structural component 1 is obtained, preferably a cylindrical tubular shell 3 of a vector 4 defined by a space module, comprising a skin 5 and a plurality of stringers 2 rigidly and integrally fixed to the second face 5c of the skin 5, the second face 5c defining, in use, an external surface of said structural component 1 adapted to be facing the environment external to the vector 4.

Thus, the internal surface of the structural component 1 does not have any stringer 2, but is smooth.

Upon examination of the characteristics of the method for the manufacture of the structural component 1 and structural component 1 described above, the advantages they allow to obtain are evident.

In particular, thanks to the fact that the stringers 2 are arranged on the second face 5c of the skin 5 and, therefore, define the external surface of the structural component 1, and preferably of the shell 3, it is possible to obtain a structural component 1 that has an improved resistance to compression and, also, an increased resistance to impacting bodies, such as micrometeorites or space debris resulting from human activities, thus guaranteeing an adequate protection of the payload contained inside the vector 4. This increase in strength is preferably obtained by a further aluminium protection layer (not shown) arranged to cover the stringers 2, i.e. as an actual outer shell of the vector 4.

At the same time, being made of composite material, the structural component 1 meets more easily the desired weight limits and therefore has a greater capacity to carry additional payload. This is particularly advantageous in the case wherein the vector 4 is defined by a space module or spacecraft.

In this case, the particular external conformation of the structural component 1, with the stringers 2 arranged on the outside, guarantees greater resistance to the stresses to which the vector 4 is subjected during the launch.

The manufacturing method according to the present invention makes it possible to obtain such a structural component 1, as it advantageously shows a procedure for obtaining a structural component 1 with external stringers 2 by means of the IML technique.

Clearly, changes and variations may be made to the method for the manufacture of the structural component 1 as described and shown herein without, however, departing from the scope of protection defined by the claims.

In particular, the manufacturing method described is equally applicable where the structural component 1 is defined by a panel, i.e. a flat portion, of the shell 3.

The invention claimed is:

1. A method for the manufacture of a structural component made of composite material reinforced with stiffening stringers, defining, in use, at least part of an outer shell of a casing and comprising a skin and a plurality of stringers having a hollow section rigidly and integrally fixed to said skin, the method comprising the steps of:
   a) laminating a plurality of first layers of non-cured or pre-cured composite material onto an external surface of a cure tool to form said skin, so that a first face of said skin defining, in use, the internal surface of the structural component facing the internal environment of the casing is facing the external surface of the tool;
   b) laminating respective pluralities of second layers of composite material on longitudinal hollow expandable inserts, thereby forming the plurality of said stringers each having a longitudinal axis, so that each stringer is wound, at least partially, on an external surface of one respective hollow insert so as to define a longitudinal cavity of each stringer that is engaged by a relative hollow insert to obtain a plurality of reinforcing elements each defined by one said stringer wound on one said hollow insert;
   c) positioning each reinforcing element on a second face of the skin opposite to said first face and defining, in use, the external surface of the structural component facing the environment external to the casing, and so that the cavities of each stringer face towards said second face;
   d) holding each reinforcing element on the second face of the skin in a respective fixed position with respect to the tool;
   e) housing the tool, the skin and the reinforcing elements inside a vacuum bag;
   f) compacting together the first layers forming the skin with the second layers forming the stringers by applying vacuum inside the vacuum bag;
   g) housing, after step f), tool, skin and reinforcing elements in a further vacuum bag;
   h) sealing the further vacuum bag to delimit a vacuum chamber therein;
   i) applying preset temperature and pressure to the outside of the vacuum chamber, in order to cure the composite material and determine the rigid and integral attachment of the stringers to the second face of the skin;
   wherein the method further comprises the step of:
   n) wrapping, prior to step c), the vacuum bag around the skin laminated on the tool, said vacuum bag comprising a plurality of adjacent longitudinal pockets sealable in a fluid-tight manner between one another;

wherein step c) of positioning comprises placing each reinforcing element inside a respective pocket, sequentially;

wherein the housing of step (e) is achieved through the wrapping of step (n) and the positioning of step (c);

wherein step f) of compacting is performed by sequentially applying the vacuum inside each pocket housing the respective reinforcing element;

and wherein step d) of holding is carried out by means of the compaction referred to in step f).

2. The method as claimed in claim 1, and further comprising the step of:
j) applying, prior to step a) of laminating, an adhesive substance on the external surface of the tool, to improve the adhesion of said first layers to said external surface during the step a).

3. The method as claimed in claim 2, and further comprising the step of:
q) applying, prior to step a) of laminating and subsequently of step j) of applying, a layer of gas-barrier material impenetrable or substantially impenetrable to gases on the external surface previously sprinkled with the adhesive substance.

4. The method as claimed in claim 1, and further comprising the step of:
k) inserting one respective pressurization bag inside the cavity delimited by each hollow insert;

wherein step g) also comprises housing the pressurization bags inside the vacuum chamber;

wherein step h) also includes arranging each pressurization bag previously housed inside the cavity of each insert in fluid communication with a cure environment outside the vacuum chamber; and wherein step i) also includes applying preset temperature and pressure inside each pressurization bag.

5. The method as claimed in claim 1, and further comprising the step of:
o) removing said vacuum bag once the compaction referred to in step f) is completed and prior to carrying out steps g), h) and i).

6. The method as claimed in claim 1, and further comprising the step of:
p) positioning, after step d) and before step e), further longitudinal inserts on the second face of the skin;

wherein step p) comprises arranging, for each reinforcing element, a pair of said further inserts, each adjacent to a longitudinal side of the respective reinforcing element, parallel to the longitudinal axis of the respective stringer.

7. The method as claimed in claim 6, wherein said further inserts are made of adhesive composite material;

wherein step e) of housing further comprises housing the further inserts in the vacuum bag; and wherein step f) of compacting comprises compacting each pair of further inserts adjacent to each reinforcing element, so that said pair of further inserts is compacted to the second layers forming the respective stringer and the first layers forming the skin at the longitudinal sides of the respective reinforcing element.

8. The method as claimed in claim 1, wherein the step a) of laminating is carried out by arranging said first layers on a smooth outer surface of said cure tool.

9. The method as claimed in claim 1, wherein the tool has a substantially cylindrical shape around a central axis;

wherein step c) of positioning is carried out by positioning said reinforcing elements on said second face of the skin in respective angularly equally spaced positions around said central axis and with the longitudinal axes of the respective stringers parallel to each other and to the central axis.

* * * * *